Sept. 18, 1934.         C. J. DUDLEY                1,974,178
                       HANDLE FOR BASKETS
                      Filed April 15, 1933

INVENTOR
COLON J. DUDLEY
BY
ATTORNEY

Patented Sept. 18, 1934

1,974,178

UNITED STATES PATENT OFFICE 1,974,178

HANDLE FOR BASKETS

Colon J. Dudley, Hamburg, N. Y.

Application April 15, 1933, Serial No. 666,346

4 Claims. (Cl. 217—125)

My invention relates in general to basket handles and in particular to a wire handle such as those used on wooden bushel baskets.

It is well known to those skilled in the art that wire handles of this type at present in use have the lower ends thereof passed but once through the hoops in the upper end of the basket, and are then turned upwardly on the inside of the hoops and in parallel relation with the U-bight portion of the handle located on the outside of the hoops. When the U-bight portion of a handle of this form is bent outwardly, as in the handling of the basket to which it is attached, or when placing a cross slat cover in position and in engagement therewith, it is forced away from the upwardly extending inner ends of the handle causing such ends to be separated or spread apart from the U-bight portion of the handle. When the handle is now brought again to its normal vertical position as lifting the basket with its contents, or when being brought into final engagement with the cross slat of the cover, the inner distorted ends are moved inwardly and project away from the inner face of the inner hoop of the basket and toward the inside of the basket and its contents where they will injure the fruit to a degree depending upon the amount of distortion.

It has been an object of my invention to provide a handle which shall have its inner basket engaging ends firmly secured in the hoops of the basket, so that even though the U-bight portion of the handle is bent outwardly and inwardly, the inner ends will not be disturbed or loosened from engagement with the basket hoops.

Another object has been to provide a handle which is easily applied and one which adds to the strength of the basket.

Furthermore, my handle is so formed and applied that the lower engaging ends are passed twice through the hoops of the basket and are then clinched over on the outside of the hoops.

The above objects and advantages have been accomplished by the device shown in the accompanying drawing, of which:

Figure 1:
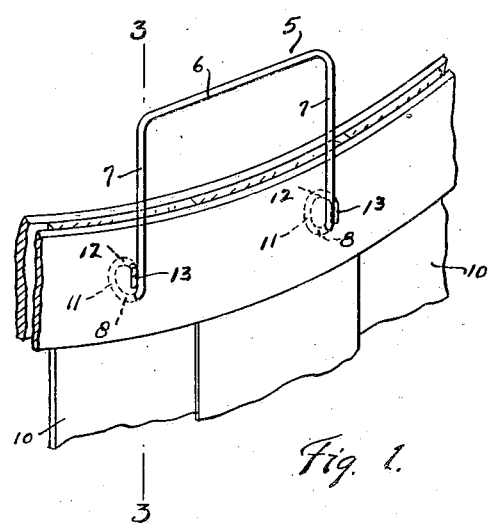
Fig. 1 is a fragmentary, perspective view of the upper end of a bushel basket with my invention applied thereto.
Figure 2:
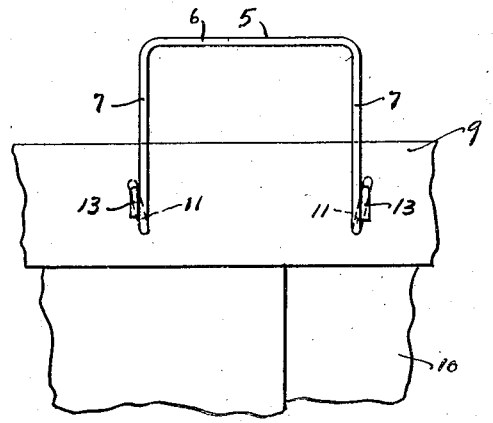
Fig. 2 is a fragmentary, outside view of the same.
Figure 3:
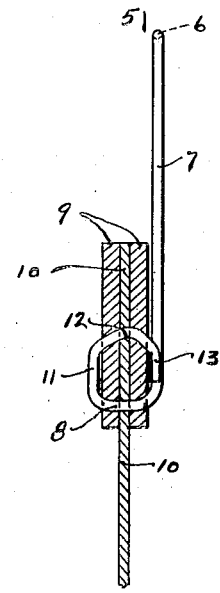
Fig. 3 is an enlarged, fragmentary, sectional view, taken on line 3—3 of Fig. 1.

My invention comprises a handle 5 made of wire and of inverted U-bight form, formed of a horizontal member 6 and two vertical members 7. Each of the vertical members 7 is provided at its lower end with a substantially right-angled portion 8 which is passed through the hoops 9 of the basket and the interposed stave 10 thereof. At the inside of the basket each end of the handle is provided with an upwardly extending inner portion 11 which terminates in an outwardly extending portion 12. This portion 12 is passed through the hoops 9 and staves 10 and terminates in a locking portion 13 which is bent downwardly on the outside of the rim of the basket. Each end of the wire is, therefore, provided substantially with a return bend. By bending the locking portion 13 over on the outside of the hoop, the wire of the handle is clinched within the basket structure. After the outwardly extending portions 12 of the handle are passed through the hoops and staves, and the locking portions 13 bent over, it will be seen that portions of the handle are passed twice through the hoops and are wrapped about sections of the hoops and staves, thus making it impossible for the handle under any bending strains to become detached. The portion 11 is inclined away from the vertical portion 7 of the handle when viewed from the front of the basket as clearly shown in Fig. 2 so as to cause the locking portion 13 to clear the vertical portion 7.

By passing the lower ends of the wire forming the handle twice through the basket hoops and stave and by clinching the locking portions 13 on the outside of the basket, the hoops and staves are securely held together, thus adding great strength to the basket. Moreover, the clinching prevents the ends of the wires from being pulled out of engagement with the hoops and thus overcome the disadvantages characteristic of the previous types of handle hereinbefore referred to.

Obviously, instead of bending the locking portion downwardly, it may be bent upwardly or sidewise so long as these portions of the handle are clinched over the outside of the basket rim.

These and other modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A handle for baskets made of wire in inverted U-shape, having its lower ends passed inwardly through the rim of the basket, inner portions extending upwardly on the inside of the basket, outwardly extending portions passed through the rim, and locking portions which extend through the rim and are clinched over on the outside of the rim of the basket, whereby the lower ends and the outwardly extending portions of the wire are locked in position, thus reinforcing the hoops and staves of the basket and preventing any thrust of the inner portions inwardly against the contents of the basket.

2. A handle for baskets made of wire in inverted U-shape, having its lower ends passed inwardly through the rim of the basket, inner portions extending upwardly on the inside of the basket, outwardly extending portions passed through the rim, and locking portions, which extend through the rim and are bent downwardly on the outside of the rim of the basket, whereby the lower ends and the outwardly extending portions of the wire are locked in position, thus reinforcing the hoops and staves of the basket and preventing any thrust of the inner portions inwardly against the contents of the basket.

3. A handle for baskets made of wire of inverted U-shape, the lower ends of the wire passing twice through the basket rim and having the free ends clinched over on the outside of the rim after being passed therethrough, whereby the lower ends and the outwardly extending portions of the wire are locked in position, thus reinforcing the hoops and staves of the basket and preventing any thrust of the inner portions inwardly against the contents of the basket.

4. A handle for baskets made of wire in inverted U-shape, having its lower ends passed inwardly through the rim of the basket, inner portions extending upwardly on the inside of the basket, outwardly extending portions passing through the rim, each being formed in inverted V-shape, and locking portions which extend through the rim and are clinched over on the outside of the rim of the basket, whereby the lower ends and the outwardly extending portions of the wire are locked in position, thus reinforcing the hoops and staves of the basket and preventing any thrust of the inner portions inwardly against the contents of the baskets.

COLON J. DUDLEY.